United States Patent
Hanisch et al.

[19]

[11] Patent Number: 6,077,475
[45] Date of Patent: Jun. 20, 2000

[54] ARRANGEMENT AND PROCESS FOR THE INDUCTIVE HARDENING OF PROFILED CAMSHAFTS

[75] Inventors: Gustav Hanisch, Hochdorf; Gerhard Haubold, Stuttgart; Reiner Schmid, Hochdorf, all of Germany

[73] Assignee: DaimlerChrysler AG, Germany

[21] Appl. No.: 09/062,771

[22] Filed: Apr. 20, 1998

[30] Foreign Application Priority Data

Apr. 18, 1997 [DE] Germany .......................... 197 16 294

[51] Int. Cl.⁷ ..................................................... C21D 1/06
[52] U.S. Cl. ......................... 266/252; 219/639; 219/602; 148/572
[58] Field of Search ............................. 148/572; 266/252, 266/249; 219/639, 602

[56] References Cited

U.S. PATENT DOCUMENTS

| | | | |
|---|---|---|---|
| 4,535,211 | 8/1985 | Carter | 219/639 |
| 4,549,057 | 10/1985 | Anderson | 219/639 |

FOREIGN PATENT DOCUMENTS

| | | |
|---|---|---|
| 42 13 147 | 11/1992 | Germany . |
| 44 04 683 | 3/1995 | Germany . |
| 2-66123 | 3/1990 | Japan . |
| 5-222458 | 8/1993 | Japan . |
| 5-222459 | 8/1993 | Japan . |

*Primary Examiner*—Scott Kastler
*Attorney, Agent, or Firm*—Evenson, McKeown, Edwards & Lenahan, P.L.L.C.

[57] ABSTRACT

In a device for inductive hardening of profiled camshafts (especially those having valve cams and zero cams) during a hardening operation, the camshaft is surrounded by an inductor and is heated by means of a magnetic field emanating from the inductor. The inductor has several axial members and radial members through which the induction current flows during the hardening operation. Dynamo sheets provided on the axial branches focus the magnetic field in the radial direction. The position and the width of the dynamo sheets is adapted to the surface profile of the camshaft, so that the focusing is aimed at areas with a small diameter.

14 Claims, 2 Drawing Sheets

ARRANGEMENT AND PROCESS FOR THE INDUCTIVE HARDENING OF PROFILED CAMSHAFTS

BACKGROUND AND SUMMARY OF THE INVENTION

The invention relates to a method and apparatus for the inductive hardening of profiled camshafts by means of a magnetic coupling of energy.

Internal-combustion engines are known which permit a cylinder to be cut-off by a charge cycle valve. Such engines have a camshaft or cut-off camshaft which has a narrow zero cam next to each valve cam, at a close axial distance. The zero cam is constructed as a flange which projects radially from the camshaft, and a cut-off rocker lever moves on its exterior surface or running surface, concentric to the axis of rotation of the camshaft. For this purpose, the running surface must be hardened and ground precisely.

Published documents disclosing cut-off camshafts with so-called concentric zero cams with a diameter that corresponds approximately to the base circle of the cams, or which are larger than the cam tip, are not known to the applicant. However, German Patent Documents DE 44 04 683 C1 or DE 42 13 147 A1 illustrate two differently shaped cams for alternative operation of the respective assigned valve. In particular, the former document is similar to a cut-off camshaft, because its coupling mechanism for the two rocking levers is analogous. In the case of the cut-off camshaft, one of the two cams (the so-called zero cam or cut-off cam) has a circular shape and is arranged concentric to the axis of rotation; it is decisive in the cutoff condition of the cylinder. The cut-off or zero cam simply holds the rocking lever in a substantially lifted-off position relative to the operating cam, so that the rocking lever no longer contacts the operating cam at any circumferential point, and the operating cam can move without contact under the pertaining rocking lever. The associated valve remains closed, and a charge cycle does not take place in the corresponding cylinder.

Known valve cams of cut-off camshafts having one base circle and one cam disk tip respectively are provided for operating the inlet and outlet valves of cylinders of an internal-combustion engine. Each valve is operated by a switch rocking lever which contacts the running surface of the valve cams. The projecting tip of the cam disk, which functions as an eccentric, actuates the switch rocking levers (and thus the valves of the rotating camshaft) during operation of the internal-combustion engine.

A cut-off of cylinders is performed by the cut-off rocking levers which are guided on the running surf aces of the zero cams. During the cut-off of cylinders, the cut-off rocking lever of a valve is connected with the corresponding switch rocking lever. As is known, the switch rocking lever will then no longer be actuated by the valve cam, so that the corresponding valve (and therefore the cylinder) is cut off.

In the case of axially close spacing with very narrow zero cams, which cannot be ground by means of grinding wheels in the plunge-cut grinding process, the diameter of the zero cams is sufficiently large that the zero cam projects slightly over the largest elevation of the valve actuating cam at the cam tip, and can be ground over the valve cams.

In the case of axial spacing which is not as close, it is known to design the zero cams wider, and to grind them in the plunge-cut grinding process. In this case, the diameters of the zero cams are designed to be as small as the base circle of the valve actuating cams, and the valve actuating cams project radially over the zero cams in the circumferential area of the cam elevation.

In both cases, a severe fracturing of the camshaft to be hardened occurs at least on a partial circumference of the camshaft—viewed in the axial direction. Such fracturing presents problems during induction hardening, since the magnetic field emitted by the inductor is coupled unevenly to the camshaft in the fractured area, unevenly heating the camshaft, and causing a non-uniform and unusable hardening.

Moreover, non-uniform heating causes local overheating, so that tension gradients occur in the camshaft during the chilling. These may result in tension cracks on the surface, and failure of the camshaft in the operation.

Furthermore, an undesirable hardening will occur in partial areas of the shaft core, which must have sufficiently high ductility for perfect functioning of the camshaft.

It is therefore an object of the invention to provide an arrangement which achieves a uniform hardness penetration of a camshaft with a profile surface, avoiding excessive tension gradients in the camshaft. Furthermore, it is an object of the invention to provide a process for the inductive hardening of a profiled camshaft which ensures a homogenous heating of the camshaft and thus the avoiding of local overheating.

This object is achieved according to the invention, by an arrangement of dynamo sheets on the axial members of the inductor. A magnetic field emanating from the inductor in the area of the dynamo sheets is focused in the radial direction. As a result, areas of the camshaft which have a smaller diameter can be acted upon by means of a higher magnetic field intensity. Since, by means of this loop shaping of the inductor, the magnetic field lines are situated in a plane which is perpendicular to the camshaft axis, there will be a lower heating of adjacent areas of the camshaft with a larger diameter so that overheating is avoided there.

Advantageously, camshafts with a profiled surface can therefore be acted upon in a targeted manner during the inductive hardening, by a magnetic field which is adapted to the profiled surface, without local overheating in larger diameter areas or of heating which is too weak in areas of smaller diameters.

By virtue of multiple heating, the process according to the invention makes it possible to divert the leading heating of the zero cams into the core of the camshaft. Thus, the valve cams are sufficiently heated without overheating of the zero cams.

Furthermore, as a result of the stepped heating, the deeper areas of the camshaft are also heated, so that tension characteristics in the camshaft which lead to the formation of cracks, can be avoided or reduced.

Other objects, advantages and novel features of the present invention will become apparent from the following detailed description of the invention when considered in conjunction with the accompanying drawings.

DETAILED DESCRIPTION OF THE DRAWINGS

Figure 1:
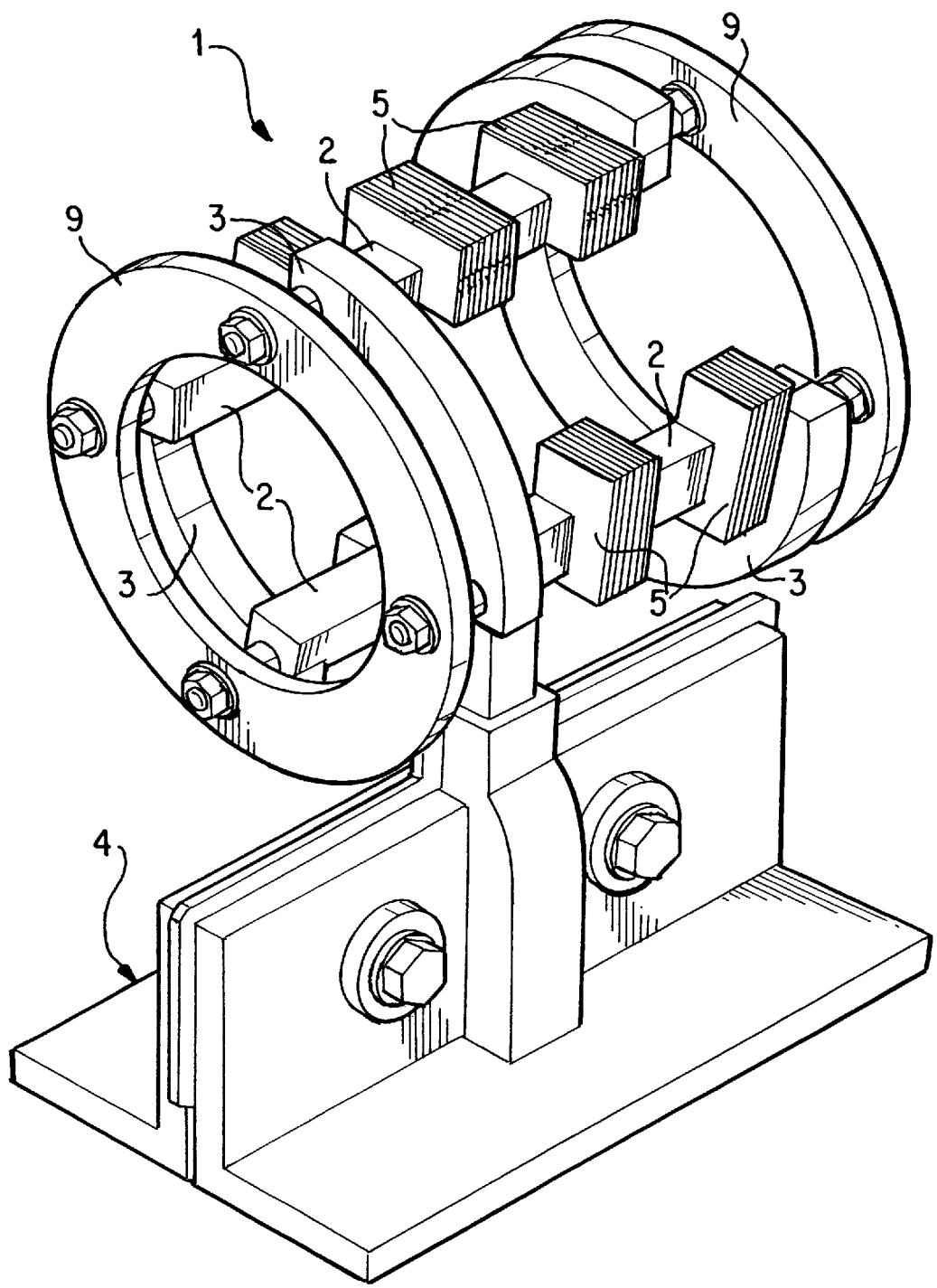
FIG. 1 is a view of an inductor according to the invention having four axial and four radial members, and a stand for the inductor.

FIG. 1 illustrates an inductor 1 with four axial members 2, four radial members 3, and a stand 4. During the hardening process, an induction current flows through the axial members 2 and the radial members 3, which are electrically connected in series via the four radial members 3. Dynamo sheets 5 provided on the axial members focus the magnetic field in the radial direction.

The dynamo sheets 5 are constructed of stacks of U-shaped core plates which are open on their side facing the center of the inductor 1, and are detachably connected with the axial members 2. This construction permits the inductor to be used in a variable manner for differently profiled rotationally symmetrical workpieces, such as profiled camshafts and cut-off camshafts known from the state of the art.

Figure 2:
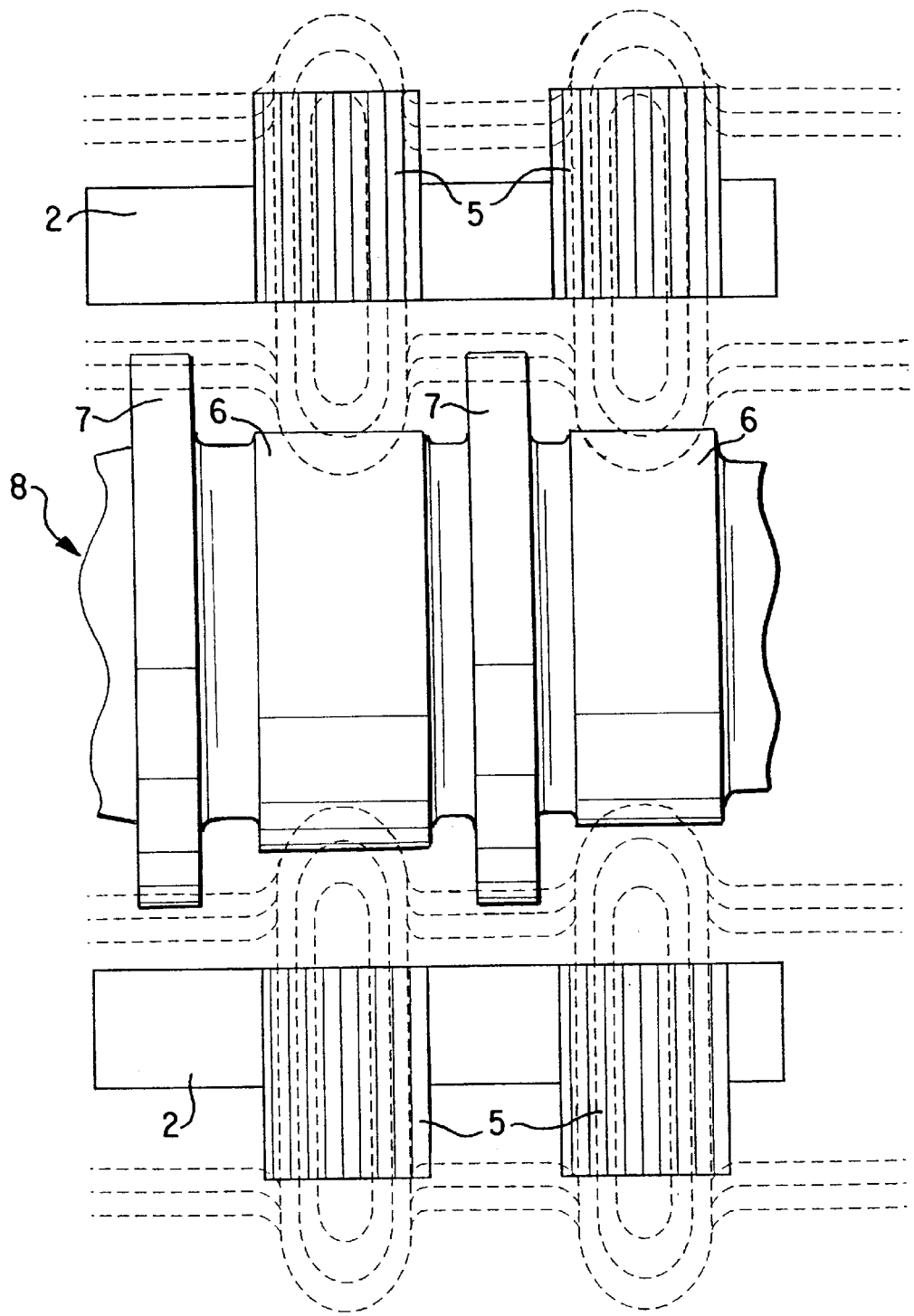
FIG. 2 is an enlarged detail of aft area of a camshaft or of a cut-off camshaft which is pushed into the inductor, showing schematically the magnetic field emanating from the inductor.

FIG. 2 illustrates a section of a camshaft or cut-off camshaft 8 which is inserted into the inductor 1, and shows schematically the magnetic field which emanates from the inductor 1. In this embodiment, the inductor 1 is constructed as a tunnel inductor which encloses the camshaft 8 (shown having a valve cam 6 and a zero cam 7), in an axial area.

In the present embodiment, the position and the width of the dynamo sheets 5 are coordinated with the position and the width of the valve cams 6 and zero cams 7 of the camshaft 8. That is, the dynamo sheets 5 are arranged on the axial members 2 adjacent the valve cams 6, whose diameter is smaller than that of the zero cams. As a result, the magnetic field is focused in the radial direction at the valve cams 6, so that they reach a temperature required for hardening. In contrast, the zero cams 7 are essentially acted upon by the magnetic field which is emitted by the axial members 2.

At each end, the inductor 1 has a stabilization ring 9 to which the axial members are fastened. The two stabilization rings 9 do not participate in the hardening of the camshaft 8, and are used primarily to stabilize the inductor 1.

The length of the axial members 2 and thus of the inductor 1 is such that one section of the camshaft 8 which comprises two valve cams 6 and two zero cams 7 can be hardened simultaneously during one hardening operation.

After the completion of the hardening operation, the camshaft 8 is displaced in the axial direction such that a section which follows the already hardened section will be situated in the inductor 1 and can be hardened.

In a further embodiment of the inductor 1 (not shown), the length of the axial members 2 or of the inductor 1 can be dimensioned such that several sections of the camshaft 8 can be hardened simultaneously so that the manufacturing time of the camshaft 8 can be shortened.

In the present embodiment, the radial play of the axial members 2 relative to the outer circumference of the zero cams 7 is dimensioned such that the zero cams 7 are coupled to the magnetic field with sufficient an intensity to heat the zero cams 7 and the valve cams 6 approximately to the same extent during the individual heating phases.

The radial members 3, which are provided as a conductive connection of the axial members 2, are arranged at a larger radial distance from the camshaft 8 than the axial members 2 so that the magnetic field emanating from the radial members 3 does not reach the camshaft 8. In this manner, it is ensured that the magnetic field emanating from the radial members 3 has no undesirable influence during the hardening of the areas of the camshaft 8 which otherwise would be acted upon by the magnetic field of the radial members 3.

As noted previously, the axial members 2 of the inductor 1 are electrically connected in series. For this purpose, the two identically situated ends of two adjacent axial members 2 respectively are alternately connected with one another by a curved radial branch 3.

In hardening the profiled camshafts 8 with zero cams 7 and valve cams 6, by means of the above-described inductor 1, in order to obtain a uniform hardness penetration depth in the camshaft 8, it is advantageous to provide heating pauses between individual heating phases. This procedure allows excess heat to flow from the zero cams 7, which have the tendency to heat up faster, radially toward the interior into the core of the camshaft, which remains cold. As a result, local overheating of the camshaft 8, which would cause cracks therein during the chilling phase following the heating phases, is avoided.

The pauses are prolonged with an increasing number of heating phases, in which case electric energy fed into the inductor 1 is increased with an increasing number of heating phases.

This approach, ensures that the zero cams 7 and the valve cams 6 have sufficient hardness on their circumference to provide the required fatigue strength. Furthermore, no overheating of the material structure takes place at any point of the camshaft 8 during the heating phases.

This process, also prevents the occurrence of high inherent tensile stress, which promotes or causes cracks, at transition points from the hardened to the unhardened material structure in the hardened camshaft 8.

The camshaft 8 is hardened only to a predetermined depth so that a tough core of the camshaft 8 will remain which, even after the hardening, has the required ductility. Thus, the camshaft 8 can withstand the dynamic stress which occurs during operation.

During the hardening operation, the camshaft 8 rotates at a defined speed about its center axis, so that a uniform and good hardening of the camshaft 8 is achieved.

In another embodiment of the inductor 1, (not shown), the inductor 1 can be provided with five or more axial members 2. This is advantageous particularly in the case of rotationally symmetrical workpieces with a profiled surface and large diameters for a uniform hardening.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and is equivalents thereof.

What is claimed is:

1. Arrangement for hardening profiled camshafts by means of an inductor into which a camshaft can be inserted during a hardening operation, for heating by a magnetic field emanating from the inductor, wherein said inductor comprises:

a plurality of substantially parallel axial members which are distributed peripherally about a longitudinal center axis of the inductor;

a plurality of radial members coupled between adjacent pairs of axial members such that an induction current can flow through said axial members and radial members during a hardening operation; and a plurality of discrete magnetic field focussing elements provided on the axial members for focusing the magnetic field in the radial direction, a position and the width of the dynamo sheets being adaptable to a surface profile of a camshaft such that the focusing of the magnetic field is aimed at areas of the camshaft with a smaller diameter;

wherein each of said discrete magnetic field focusing elements comprises a laminated stack of U-shaped core plates, and is detachably mountable on said axial members at continuously variable axial positions.

2. Arrangement according to claim 1 wherein opposite ends of the axial members are fastened to a plurality of stabilization rings.

3. Arrangement according to claim 1 wherein the inductor comprises a tunnel adapted to enclose a camshaft in an axial area.

4. Arrangement according to claim 1 wherein the inductor comprises four straight-line, axially extending axial members through which induction current flows.

5. Arrangement according to claim 1 wherein the axial members are distributed approximately uniformly about a circumference of the inductor.

6. Arrangement according to claim 1 wherein the axial members all have approximately the same radial distance from said longitudinal center axis, whereby said axial members are adapted to surround zero cams of a camshaft inserted along said center axis, with a preset radial play.

7. Arrangement according to claim 1 wherein said U-shaped core plates have an open construction on a side facing an installation position for a camshaft.

8. Arrangement according to claim 1 wherein a position and width of the discrete magnetic field focussing elements are adaptable to conform to a position and width of valve cams on a camshaft inserted along said center axis of said inductor.

9. Arrangement according to claim 1 axial spacing of said discrete magnetic field focussing elements is adapted to coincide with predetermined features of a camshaft inserted along said center axis of inductor whereby said predetermined features are coupled to the magnetic field with an intensity such that said predetermined features and remaining portions of said camshaft heat up approximately to the same extent during a heat-up time.

10. Arrangement according to claim 1 wherein for serial wiring of the axial members, identically situated ends of adjacent axial members are connected with one another by an arc-shaped radial branch.

11. Arrangement according to claim 1 wherein the radial members connecting the axial members are arranged at a greater radial distance from said longitudinal center axis than are the axial members.

12. A process for hardening profiled camshafts, by means of an inductor into which a camshaft can be inserted during a hardening operation, for heating by a magnetic field emanating from the inductor, wherein said inductor comprises:

a plurality of axial members;

a plurality of radial members coupled to the axial members such that an induction current can flow through said axial members and radial members during a hardening operation; and a plurality of dynamo sheets provided on the axial members for focusing the magnetic field in the radial direction, a position and the width of the dynamo sheets being adaptable to a surface profile of a camshaft such that the focusing of the magnetic field is aimed at areas of the camshaft with a smaller diameter, said process comprising:

performing a series of heating phases, with pauses length of the between individual heating phases to let excess heat flow radially to an inside of a camshaft inserted into the inductor during each phase;

prolonging the pauses with an increasing number of heating phases;

increasing electric energy fed into the inductor with a rising number of heating phases; and after the hardening the camshaft, chilling it by means of a chilling agent.

13. A process according to claim 12, further comprising:

rotating the camshaft about its center axis during the hardening.

14. Apparatus for inductive heating of a shaft according to an axially varying pattern, comprising:

a pair of parallel mutually spaced apart stabilizing rings mounted to a support member;

a plurality of electrically conductive substantially parallel axial members supported by and between said stabilizing rings and distributed peripherally about a longitudinal axis of said apparatus;

a plurality of electrically conductive circumferentially disposed members connecting alternate ends of adjacent pairs of axial members, each of said axial members being connected at one end thereof with a first peripherally adjacent axial member and at an opposite end thereof with a second peripherally adjacent axial member; and a plurality of discrete magnetic field focussing elements provided on said axial members;

wherein each of said discrete magnetic field focussing elements comprises a laminated stack of U-shaped core plates, and is detachably mountable on said axial members at continuously variable axial positions.

\* \* \* \* \*